April 7, 1953     C. E. BRANICK     2,634,095
TIRE HOIST
Filed June 3, 1950
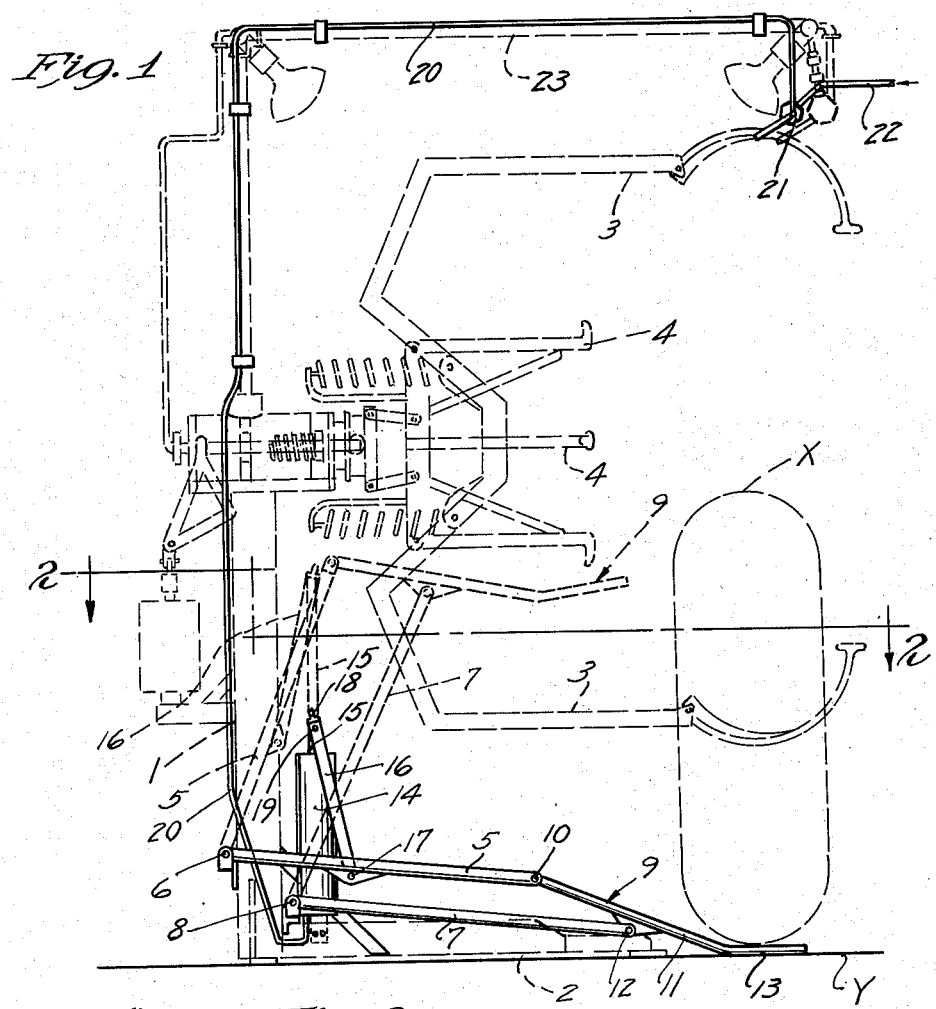
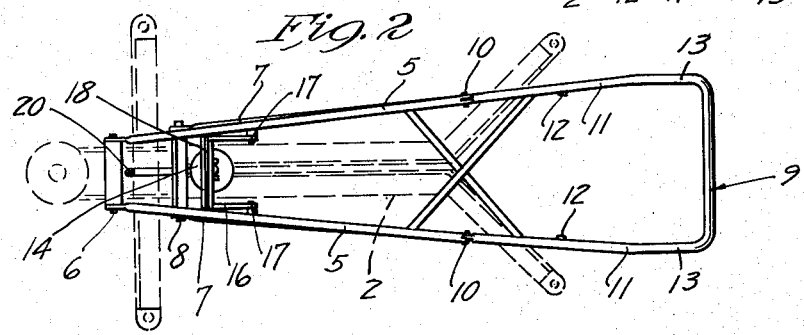
Inventor
Charles E. Branick
By his Attorneys
Merchant & Merchant Patented Apr. 7, 1953

2,634,095

UNITED STATES PATENT OFFICE 2,634,095

TIRE HOIST

Charles E. Branick, Fargo, N. Dak.

Application June 3, 1950, Serial No. 165,919

1 Claim. (Cl. 254—131)

My invention relates to mechanical tire spreaders and more particularly to tire lifting attachments therefor.

In tire spreaders of the type disclosed and claimed in my Patent No. 1,943,784, wherein the tire spreading arms are in vertically-spaced relationship to the ground, it is frequently difficult, if not impossible, for one person to lift a given tire into engagement with the spreader arms. It is the primary object of this invention to provide means whereby such tires may be quickly and easily elevated by mechanical means from the floor to operative position upon the tire spreading arms.

A still further object of my invention is the provision of an attachment for tire spreaders of the general type above described, which has a minimum of working parts, which has a great lifting force, and which is completely safe to operate.

A still further object of my invention is the provision of a device of the class described, which is inexpensive to produce, easy to maintain and extremely durable.

The above and still further objects of my invention will become apparent from the following detailed specification, appended claim and attached drawings.

Referring to the drawings wherein like characters indicate like parts throughout the several views:

Fig. 1 is a view in side elevation of my novel structure attached to a tire spreader, the latter being shown by dotted lines; and Fig. 2 is a view partly in section and partly in plan taken on the line 2—2 of Fig. 1.

Referring with greater particularity to the drawings, the numeral 1 indicates in its entirety a frame having a forwardly-projected horizontally-disposed supporting foot 2. A plurality of circumferentially-spaced spreading arms 3 adapted to extend around the outside of a tire casing X project forwardly from the upper portion of the frame 1 in spaced relation to the ground, whereas a plurality of circumferentially-spaced inside spreading arms 4 are mounted in like manner and adapted to cooperate with the arms 3 in a well known manner.

The means for imparting the desired spreading and pivotal movements to the arms 3 and 4 form no part of the instant invention and will not be herein described.

My novel lifting attachment for spreaders of the type broadly described above comprises a pair of laterally-spaced lifting arms 5 adapted to be secured at their rear ends to the frame 1 intermediate the supporting foot 2 and the arms 3 for swinging movements about a common horizontal axis 6. A second pair of laterally-spaced lifting arms 7 are adapted to be secured at their rear ends to the frame 1 intermediate the foot 2 and the first-mentioned pair of lifting arms 5 for swinging movements about a common horizontal axis 8. It will be noted that the axis 8 is preferably forwardly spaced with respect to the axis 6. A generally U-shaped tire lift 9 is shown as having its rearwardly-projected ends pivotally secured one each to one of the forwardly projected ends of the lifting arms 5, as indicated by the numeral 10. The forwardly-projected ends of the lifting arms 7 are shown as being pivotally secured to the intermediate portion of the side-forming members 11 of the U-shaped lift, as at 12. The forwardly-projected end 13, or bite of the lift 9, in advance of the pivotal connections 12, is angularly disposed, whereby to lie flat on the ground Y when the lifting arms are moved to their lowermost position, as indicated by full lines in Fig. 1. A generally vertically disposed cylinder 14 is shown as positioned intermediate the laterally-spaced pairs of lifting arms 5 and 7 by any suitable means. A piston, not shown, within the cylinder 14 is provided with a rod 15, which projects outwardly from the upper end of the cylinder 14. An inverted U-shaped link 16 is shown as having one each of its lower ends pivotally secured to the intermediate portions of the lifting arms 5, as indicated at 17. The upper closed end 18 of the link 16 is pivotally secured as at 19 to the outer end of the piston rod 15. A fluid conduit 20 connects the lower end of the cylinder 14 with a three-way valve 21 of the type disclosed and claimed in my Patent No. 2,310,892. Valve 21 is, in turn, connected to a source of pressure, not shown, through a pipe 22. As shown, the pipe 20 is secured to the frame 1 and to an angular mounting bracket 23, so as to position the valve 21 convenient to the operator.

From the above it should be clear that by manipulation of the valve 21, air or other suitable fluid under pressure may be forced into the cylinder 14, whereby to move said rod 15 and associated parts 5, 7, 9 and 16 from the full line to the dotted line position of Fig. 1. In this position, the tire X may be placed upon the inside spreader arms 4 by merely allowing the upper portion of the tire to drop forwardly. The precise amount of elevation of the lift 13 is, of course, determined by the overall diameter of the tire X being lifted. In any event, movement of the valve to an intermediate position will hold the tire X at the desired height until the same is placed upon the spreader arms 4. Return of the parts above described from the dotted line to the full line position may be achieved by releasing of the air from the pipe 20, allowing the same to drop under the action of gravity. This action may be speeded up by any suitable spring means, not shown, if desired.

My invention has been thoroughly tested and found to be completely satisfactory for the accomplishments of the above objects, and while I have disclosed a commercial form of my invention, it should be obvious that the same is capable of modification without departure from the scope of the appended claim.

What I claim is:

In a tire lifting and spreading device including a rigid vertical support adapted to rest upon a horizontal surface and including two pairs of substantially parallel vertically spaced lifting arms with said pairs of arms disposed in horizontally spaced relation on opposite sides of said support and pivotally connected thereon for vertical swinging movement relative thereto at their inner ends; a generally U-shaped tire engaging and lifting member having the inner spaced end portions of the legs thereof pivotally connected to each of the arms of said pairs of arms at longitudinally spaced points along said legs, and the outer portions of each of said legs adjacent the bite of said U-shaped member being vertically angled with respect to the rearward portions of said legs and extending parallel to and adapted to rest upon said horizontal supporting surface, whereby a tire to be engaged and lifted by said U-shaped member between the forward angled leg portions thereof may be rolled into the space therebetween and engage the bite.

CHARLES E. BRANICK.

REFERENCES CITED

The following references are of record in the file of this patent:

UNITED STATES PATENTS

| Number | Name | Date |
|---|---|---|
| 1,570,071 | Mercier | Jan. 19, 1926 |
| 1,684,606 | Thielen | Sept. 18, 1928 |
| 2,477,858 | Brabbin | Aug. 2, 1949 |

FOREIGN PATENTS

| Number | Country | Date |
|---|---|---|
| 653,079 | Germany | Nov. 13, 1937 |